(12) United States Patent
Gilbertson et al.

(10) Patent No.: US 10,560,776 B2
(45) Date of Patent: Feb. 11, 2020

(54) IN-EAR NOISE DOSIMETER

(71) Applicant: WISYS Technology Foundation, Inc., Madison, WI (US)

(72) Inventors: Lynn Gilbertson, Evansville, WI (US); Donna Jean Holzer Vosburgh, Whitewater, WI (US); Timothy Klein, Norton Shores, MI (US)

(73) Assignee: WiSys Technology Foundation, Inc., Madison, WI (US)

( * ) Notice: Subject to any disclaimer, the term of this patent is extended or adjusted under 35 U.S.C. 154(b) by 0 days.

(21) Appl. No.: 15/475,747

(22) Filed: Mar. 31, 2017

(65) Prior Publication Data

US 2017/0289670 A1   Oct. 5, 2017

Related U.S. Application Data

(60) Provisional application No. 62/316,005, filed on Mar. 31, 2016.

(51) Int. Cl.
*H04R 29/00* (2006.01)
*H04R 1/10* (2006.01)

(52) U.S. Cl.
CPC ......... *H04R 1/1083* (2013.01); *H04R 1/1016* (2013.01); *H04R 2201/003* (2013.01); *H04R 2201/107* (2013.01)

(58) Field of Classification Search
CPC ...... H04R 29/00; H04R 1/1016; H04R 25/70; H04R 1/1083; H04R 1/1008; H04R 2201/003; H04R 2201/107
USPC ...... 381/58, 74, 23.1, 312, 328, 382, 56, 60; 181/130
See application file for complete search history.

(56) References Cited

U.S. PATENT DOCUMENTS

| | | | |
|---|---|---|---|
| 5,907,538 A * | 5/1999 | White | H04M 9/08 370/276 |
| 6,456,199 B1 | 9/2002 | Michael | |
| 2002/0101515 A1 * | 8/2002 | Yoshida | H04N 1/00236 348/211.99 |
| 2004/0165742 A1 * | 8/2004 | Shennib | H04R 25/456 381/326 |
| 2005/0254667 A1 | 11/2005 | Michael | |
| 2008/0144841 A1 * | 6/2008 | Goldstein | G01H 3/14 381/56 |
| 2010/0278350 A1 * | 11/2010 | Rung | G01H 3/14 381/59 |
| 2013/0343564 A1 * | 12/2013 | Darlington | H04R 1/1016 381/74 |
| 2014/0294191 A1 * | 10/2014 | Parkins | A61F 11/06 381/72 |
| 2016/0063986 A1 * | 3/2016 | Ben-Ami | G10K 11/178 381/71.6 |

OTHER PUBLICATIONS

Svantek; "Microphone in Real Ear" MIRE MEasurements with the SV 102; Brochure and the Web: www.Sensidyne.com: 2 pages: 2017; US.

* cited by examiner

*Primary Examiner* — Norman Yu
(74) *Attorney, Agent, or Firm* — Boyle Fredrickson S.C.

(57) ABSTRACT

An in-ear microphone allowing assessment of sound pressure level directly of an individual's ear canal without intervening conduits between the sound source (i.e., ear canal) and the microphone is provided. Sound from an in-ear communications device may also be isolated from ambient noise using an in-line noise detector for recording the noise from the in-ear communications device.

12 Claims, 4 Drawing Sheets

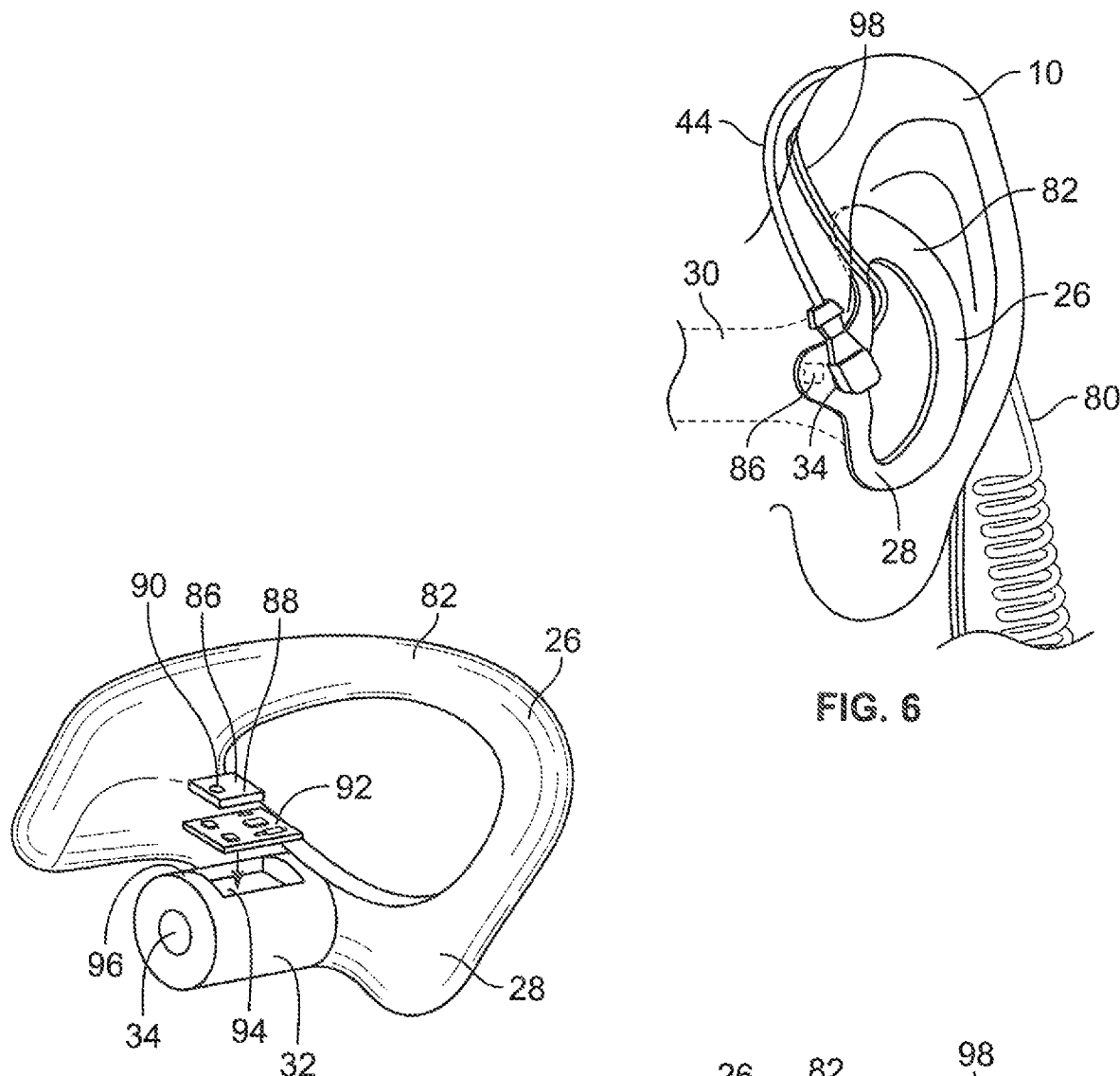
FIG. 6
FIG. 7
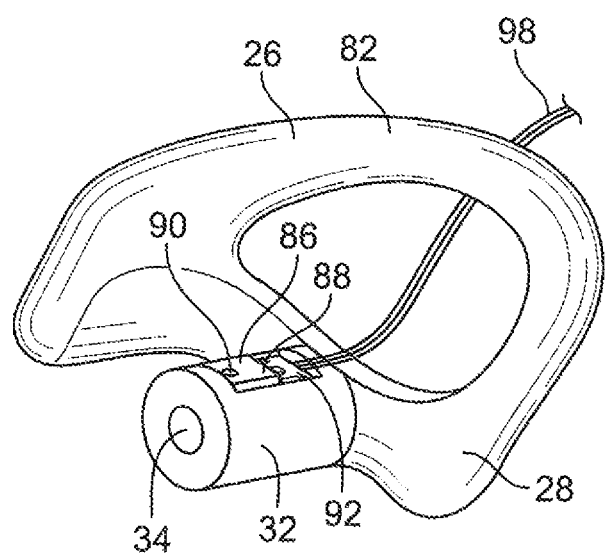
FIG. 8

IN-EAR NOISE DOSIMETER

CROSS REFERENCE TO RELATED APPLICATION

This application claims priority to US provisional application No. 62/316,005, filed Mar. 31, 2016, and hereby incorporated by reference.

BACKGROUND OF THE INVENTION

The present invention relates to a noise dosimeter for assessing exposure to noise levels, for example, to determine occupational noise exposure.

Measuring noise is an important element of programs to prevent hearing loss caused by noise exposure. Such measurements are normally conducted with a noise dosimeter that can be used to measure environmental noise. Such dosimeters provide a sensitive broad-spectrum microphone that may be calibrated to a standard and include circuitry for calculation of sound pressure levels including, for example, peak sound pressure level and time average sound pressure levels. The circuitry may include filtering to provide different weightings conforming to sound exposure safety standards.

Current noise dosimeters can be lightweight and portable, for example, to be attached to a person's clothing at the shoulder near the ears for continuous environmental noise monitoring.

SUMMARY OF THE INVENTION

Currently available dosimeters do not allow noise measurement in the ear canal. The present inventors have determined that this can be a significant shortcoming when the individual is wearing an earpiece or headset of a type that may introduce sound, for example, from an audio transducer, directly into the ear canal. For example, during lab testing, a difference of approximately 1-13 decibels of sound pressure level was measured between a shoulder-measured sound dose and sound dose in the ear when an earpiece or headset was being used for radio communication. Field tests indicate a 2-27 dB difference in sound pressure level between these two measurement points.

These differences in sound pressure level, between the ear canal and shoulder, can have significant implications for hearing health. For example, increasing a noise by 6 decibels of sound pressure level is roughly equivalent to doubling of intensity. Adding a 10 decibel sound pressure level is roughly equivalent to doubling of perceived loudness. Levels above the OSHA action level of about 85 decibels of sound pressure level were measured during field testing.

The present invention accordingly provides a microphone adapter allowing assessment of the sound pressure level in an individual's ear canal while using shoulder, level dosimeters, Different versions of the invention accommodate a range of common earpieces and headsets.

The present invention also provides an in-ear microphone allowing assessment of sound pressure levels directly from an individual's ear canal without intervening conduits between the sound source (i.e., ear canal) and the microphone. In this manner, sound will not be distorted through travel through tubes or pipes. The present inventors have found that even short distances of travel through a conduit may affect the measurement of sound at the microphone due to physical properties of the sound transmission such as conduit length, diameter, mass and stiffness. These physical properties tended to affect the frequency of noise resonated and propagated to the microphone, e.g., high frequencies were more affected than low frequencies.

The present invention also provides that sound from an in-ear communications device may be isolated from ambient noise using an in-line noise detector for recording the noise from the in-ear communications device.

In one embodiment of the present invention, a system for making in-ear measurements of sound pressure levels may be provided comprising an ear piece sized to fit within an ear canal of the human user: and a microphone coupled to the ear piece at a location within the ear canal and adapted to receive sound pressure signals from within the ear canal wherein the sound pressure signals are communicated to a sound monitor.

It is thus a feature of at least one embodiment of the present invention to position the microphone within the ear canal so that sound pressure signals may be received directly within the inner ear.

The ear piece may have a tubular stub extending into the car canal acid the microphone is coupled to an exterior surface of the tubular stub.

It is thus a feature of at least one embodiment of the present invention to detect sound levels from both transmitted sounds from the two way transmitter and ambient noise.

The microphone may be installed within a pocket nested within the tubular stub. The microphone may be substantially flush with the exterior surface of the tubular stub.

It is thus a feature of at least one embodiment of the present invention to maintain comfort to the user when wearing the earpiece.

The microphone may be positioned adjacent to a posterior wall of the ear canal. The microphone may be mounted on a printed circuit board. The microphone maybe a MEMS microphone.

It is thus a feature of at least one embodiment of the present invention to place the microphone within the ear canal to produce more accurate representations of sound levels.

The ear piece may have a rim sized to fit within a concha of an outer ear of the human user It is thus a feature of at least one embodiment of the present invention to allow for vented two way communication while using the microphone device.

The tubular stub may receive an audio signal from a remote transducer. The remote transducer may be a two-way radio.

An audio recording device may be installed between the remote transducer and the connector and recording the audio signal. The audio recording device may be simultaneously outputted to the tubular stub. The audio recording device may convert the audio signal to a MP3 file.

It is thus a feature of at least one embodiment of the present invention to isolate the sounds from the two way transmitter from the ambient noise.

In an alternative embodiment of the present invention, a system for making in-ear measurements of sound pressure levels may be provided comprising an ear piece disposed within the ear canal and having a connector communicating with a flexible conductor extending to a location outside of the car canal; and an external dosimeter coupled to an opposite end of the flexible tubular conductor and adapted to receive sound pressure signals from within the ear canal.

It is thus a feature of at least one embodiment of the present invention to provide improved sound level measurement within the ear when using standard shoulder level portable noise dosimeters.

The external dosimeter may have a microphone for receiving the sound pressure signals.

An adapter receiving the sound pressure signals from the ear canal and conformed to fit over the microphone of the dosimeter.

These particular objects and advantages may apply to only some embodiments falling within the claims and thus do not define the scope of the invention.

BRIEF DESCRIPTION OF THE DRAWINGS

FIG. 6 is a perspective view of an in-ear mold having a built-in microphone;

FIG. 7 is a rear exploded perspective view of the in-car mold of FIG. 6 showing a printed circuit board and sensor inserted into a canal portion of the in-ear mold;

FIG. 8 is a figure similar to FIG. 7 showing the printed circuit board and sensor installed into the canal portion of the in-ear mold;

DETAILED DESCRIPTION OF THE PREFERRED EMBODIMENT

In-Ear Adapter for Shoulder Dosimeter

Figure 1:
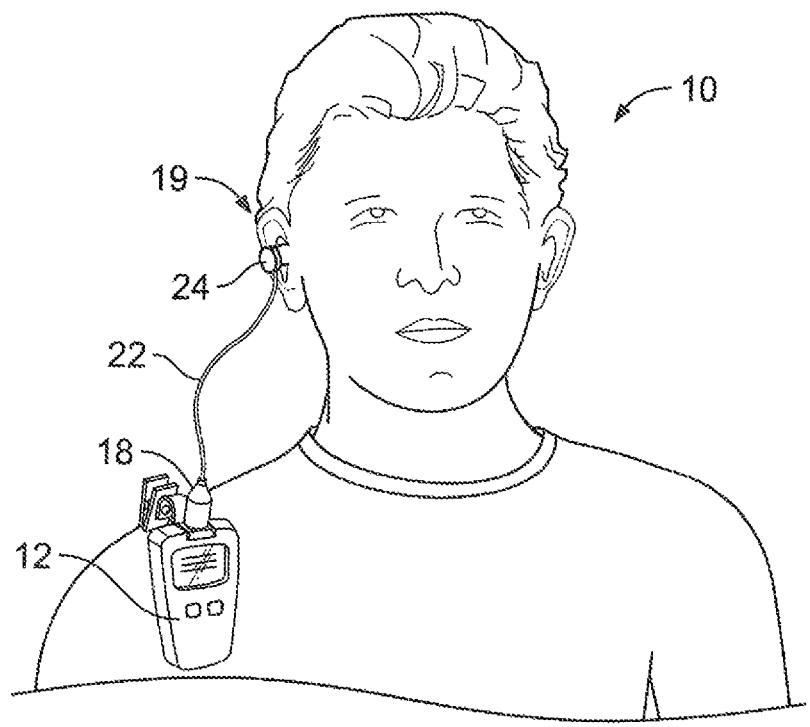
FIG. 1 is a simplified depiction of a commercial shoulder-mounted noise dosimeter adapted for use in-car canal measurements using the present invention.
Figure 2:
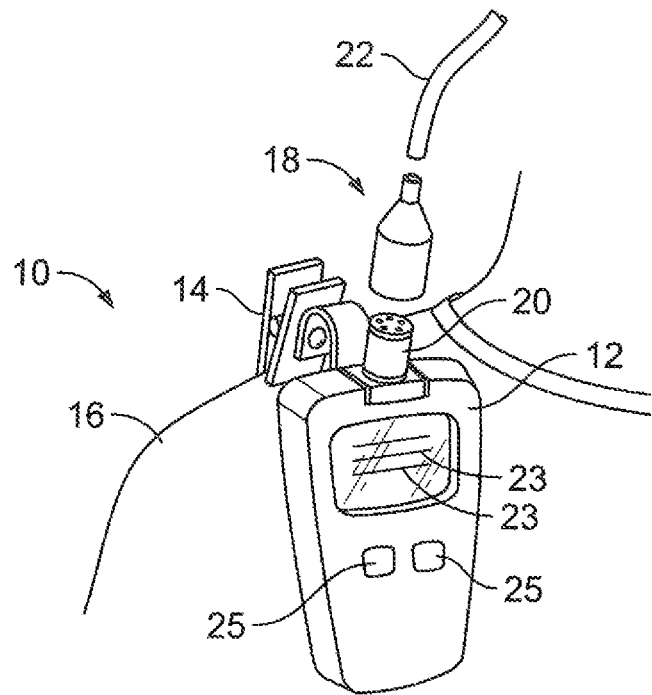
FIG. 2 is a detailed fragmentary view of the noise dosimeter showing an adapter cup fitting over the dosimeter microphone to attach it to a flexible tube leading to the ear canal.

Referring now to FIGS. 1 and 2, an individual 10 may wear a portable noise dosimeter 12 on their shoulder, for example, as held by a clip 14 attached to clothing 16 of the individual at shoulder height. The dosimeter 12 may have a microphone 20 extending upward and forward from the top of the dosimeter 12. Dosimeters of this type are commercially available from the 3M Company of St. Paul, Minn., under the tradename of Edge Noise Dosimeter, for example, model EG5-D; Cirrus Research of the United Kingdom, under the tradename of doseBadge, for example, model doseBadge[5]: Larson Davis of Depew, N.Y., under the tradename Spark, for example, model 703+, 705+, 706RC; Casella CEL Inc. (subsidiary of Ideal Industries) of Buffalo, N.Y., under the tradename of dBadge and dBadge 2, and other commercially available noise dosimeters.

An adapter 18 may provide for a sleeve conforming to and fitting over a cylindrical microphone 20 of the dosimeter 12, the sleeve having an internal tapered channel allowing for sound to be communicated to the microphone 20 from a smaller diameter flexible tubing 22 attached to an upper end of the adapter 18. The tubing 22 may lead to an ear-adapter 24 in the ear 19 of the individual 10 for measurement of sound in the ear canal of the individual 10.

The tubing 22 will impart its own audio characteristics to the measured sound conducted from the car canal including attenuation caused by the tube length and frequency spectrum modification caused by the distributed transmission properties of the tubing 22. These modifications may be accommodated by software adjustment of the processing of the sound by the dosimeter 12. In this regard, the dosimeter 12 may include an internal microcontroller (not shown) having an analog-to-digital converter reading electrical signals produced by the microphone 20 and processing those signals according to a stored program to provide display outputs 23 or possibly audio alerts. Such processing may, for example, include spectral analysis and filtering time integration and peak detection as is generally understood in the art. Control buttons 25 on the dosimeter 12 may be used to change formats of the displayed output 23 and to indicate that the adapter system of the present invention is employed so that suitable calibration changes may be made in producing the display outputs 23.

Figure 3:
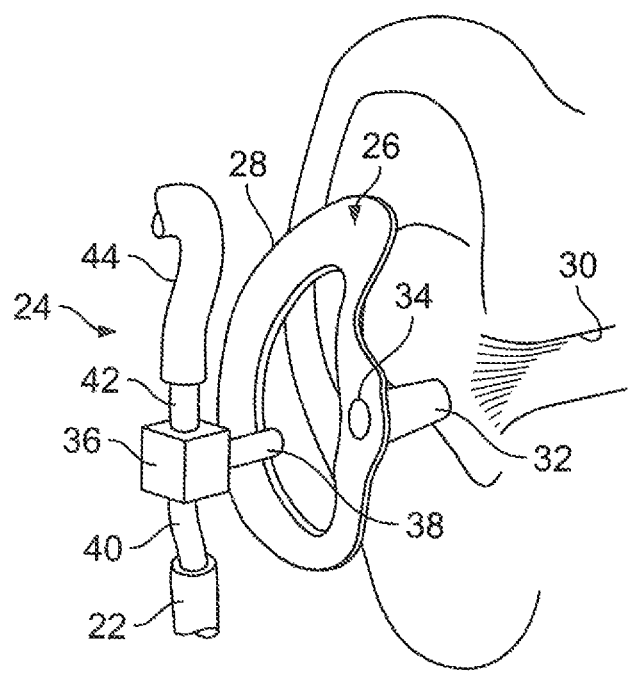
FIG. 3 is an exploded perspective view of an ear-adapter of the present invention for use with in-ear molds.

Referring now to FIG. 3, the ear ear-adapter 24 may include an ear mold 26 having a rim 28 fitting in the concha of the outer ear of the individual 10 to support the ear mold relative to the ear canal 30. The ear mold 26 may include a short tubular stub 32 extending into the ear canal 30 and presenting arm outer hole 34 normally receiving a tube 44 communicating sound from a remote audio transducer (such as an electromagnetic speaker or piezoelectric transducer) on radio or the like.

In the depicted embodiment, a three-way connector 36 provides a manifold of three mutually intercommunicating tubes including a first tube 38 that may be received in the hole 34, a second tube 40 that may attach to the tubing 22 leading to the dosimeter 12 and a third tube 42 that may attach to the tube 44 from the audio speaker of a radio or the like such as normally would be connected directly to the hole 34. In this way the three-way connector 36 provides a tap of the sound delivered to the ear that may be diverted to the dosimeter 12 for measurement.

Figure 4:
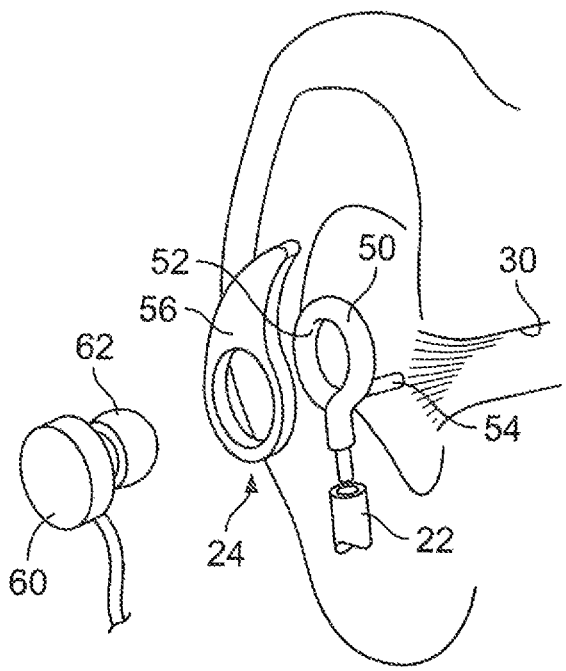
FIG. 4 is a figure similar to that of FIG. 3 showing an adapter for use with earbuds having a portion inserted into the ear canal.

Referring now to FIG. 4, an alternative embodiment of the invention provides for a ring adapter 50 having a central opening 52 sized to approximate the diameter of the ear canal 30 and supporting at its edge a tubular conduit 54 having a first portion that may extend into the ear canal 30 and a second portion extending downward from the ring adapter 50 to receive tubing 22. Elastomeric supports 56 may attach around the ring adapter 50 to stabilize the ring adapter 50 in alignment with the ear canal 30 against the concha. An ear bud 60 having an in-ear portion 62 may then be inserted through the central opening 52 and a corresponding end-aligned opening in the elastomeric supports 56 to fit along the side of the conduit 54 in the ear canal 30 thereby sampling sound pressure level directly in the ear canal to be sent to the dosimeter 12.

Figure 5:
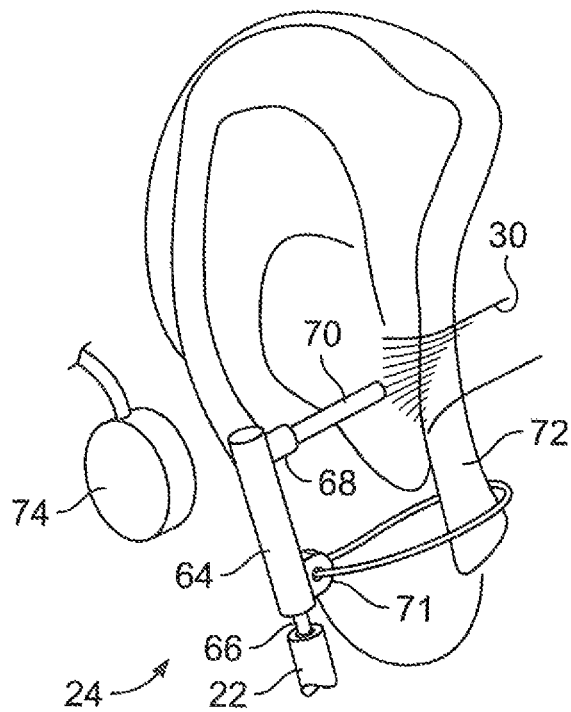
FIG. 5 is a figure similar to FIGS. 3 and 4 showing an adapter for use with a headset supported by an ear hook.

Referring now to FIG. 5, in an alternative embodiment a right angle adapter 64 may provide a downwardly extending tube 66 that attaches to tubing 22. The tube 66 communicates with a right angle connection 68 that may be attached to a small flexible silicone tube 70 that may fit within the ear canal 30. The right angle adapter 64 may include a tie point 71 that allows it to be attached to an ear hanger 72 that may curve around the outside of the external ear to support the right angle adapter 64. This same hanger 72 may support an earpiece 74 that either may fit over the ear canal 30 sandwiching the right angle adapter 64 between it and the ear canal 30 or may have an in-ear portion that may share the volume of the ear canal 30 with the tubing 70. The earpiece 74 may, for example, be an audio transducer. Again the tubing 22 allows for sampling of in-ear sound pressure levels by the dosimeter 12.

In-Ear Microphone Dosimeter

Referring now to FIGS. 6 through 8, an individual 10 may wear a two-way communication device 80 having an earpiece 82 or headset communicating with a remote audio transducer 84 (see FIG. 9), for example, a radio, phone, MP3 player, etc. The earpiece 82 may be "vented" so that ambient noises may also be heard. The two-way communication device 80 is commonly worn by police officers, firefighters, construction workers, as a way to communicate with other professionals. However, when ambient noise is at a high level, the individual 10 may increase the volume levels on their remote audio transducer 84, It is desired to measure the noise levels within the ear canal accounting for both the ambient noise and the two-way communication.

A microphone 86 is adapted to be installed within the earpiece 82 to measure noise from the remote audio transducer 84 and ambient noise from the individual's 10 surroundings. The microphone 86 may be a micro electrical mechanical system (MEMS) microphone 86 having a sensor and an integrated circuit interface. As is understood in the art, the sensor may be a silicon capacitor consisting of two silicon plates or surfaces. One plate is fixed and the other is movable on one end while being bonded on another end (i.e., cantilevered). The fixed plate is covered by an electrode to make it conductive and includes acoustic holes which allow sound to pass through. A ventilation hole allows the membrane to move back and forth within the pressure chamber. When sound waves pass through the capacitor, the integrated circuit converts the change in capacitance to a digital or analog output.

The MEMS microphone 86 may be enclosed within a housing 88 having a sound inlet hole or top port 90 placed at the top of the housing 88. The housing 88 may be a plastic package having wall conforming to an enclosed box having a top wall, a bottom wall and sidewalls. The top wall may hold the top port 90 for the acoustic energy to reach the sensor. The bottom wall may be a substrate on which the sensor and integrated circuit are fixed or bonded and which include the electrical connections. The MEMS microphone 86 may have three electrical connections: ground, output signal, and a voltage supply pin delivering a voltage to the MEMS microphone 86.

The MEMS microphone 86 is bonded to a printed circuit hoard 92 accepting the three electrical connections of the MEMS microphone 86. For example, the MEMS microphone 86 may be stacked on the printed circuit board 92 such that the bottom wall of the housing 88 contacts the printed circuit board 92. The printed circuit board 92 may have a larger surface area than the MEMS microphone 86 such that the printed circuit board 92 extends past the MEMS microphone 86. The printed circuit board 92 may be a breakout board breaking out each conductor to a terminal that can accept a hook up wire for distribution.

The MEMS microphone 86 and printed circuit board 92 are installed on an ear mold 26 having a rim 28 fitting in the concha of the outer ear of the individual 10 to support the ear mold relative to the ear canal 30. The rim 28 may be between 0.7 and 1.3 inches, or about 1 inch.

The ear mold 26 may include a short tubular stub 32 extending into the car canal 30. The tubular stub 32 may be between 0.5 and 1 inch. The tubular stub 32 may present an outer hole 34 normally receiving a tube 44 communicating sound from the remote audio transducer 84 to the outer hole 34 and through a passage within the tubular stub 32 to an inner hole at the other end of the passage. It is understood that the tubular stub 32 may have an outer diameter that is less than an inner diameter of the ear.

In one embodiment, the tube 44 may be a skeleton style tube with one end connected to the outer hole 34 and an opposite end having an adapter for connection to a connector of the remote audio transducer. In an alternative embodiment the outer hole 34 may receive an analog signal from an electrical connector communicating sound from the remote audio transducer 84.

The tubular stub 32 may include a hollow, mounting pocket 94 extending within the outer surface 96 of the tubular stub 32. The mounting pocket 94 may be sized, and shaped to receive the printed circuit board 92 and may have a depth that less than a total thickness of the wall of the tubular stub 32. The mounting pocket 94 may have a depth that is substantially equal to a height of the printed circuit board 92 and MEMS microphone 86.

The mounting pocket 94 may be oriented such that the mounting pocket 94 is adjacent a posterior wall of the ear canal when the ear mold 26 is inserted into the individual's 10 ear. In an alternative embodiment, the mounting pocket 94 may be oriented such that the mounting pocket 94 is adjacent an anterior wall of the ear canal.

The printed circuit board 92 and MEMS microphone may be installed within the mounting pocket 94 such that the printed circuit board 92 lies within the mounting pocket 94 and the MEMS microphone 86 extends outwardly from the mounting pocket 94 and the top port 90 is exposed to the exterior surroundings. The MEMS microphone 86 may be substantially flush with the outer surface 96 of the tubular stub 32 to eliminate discomfort to the individual 10 and prevent the MEMS microphone 86 from falling out. It is understood that the MEMS microphone 86 may extend within the ear canal without substantial contact with the inner walls of the ear canal 30.

A connector 98 may provide communication between the printed circuit board 92 and a noise dosimeter 12 (see FIG. 1). The connector 98 may extend from the printed circuit board 92 to a front of the ear mold 26 and be further connected to the remote audio transducer 84. In an alternative embodiment, the noise dosimeter 12 may be a sound monitoring device that is built into the ear mold 26 or in-ear device such as a hearing aid.

When worn, the ear mold 26 may be placed within the concha of the outer ear of the individual 10 with the short tubular stub 32 extending within the ear canal 30. The MEMS microphone 86 extends into the ear canal and directly senses the noise received through the tubular stub 32 from the remote audio transducer 84 as well as ambient noise.

Although the MEMS microphone 86 is shown being used with the ear mold 26 as seen in FIG. 3, it may also be incorporated into other in-ear devices shown in FIGS. 4 and 5 without departing from the spirit of the present invention.

As seen in FIG. 4, the tubular conduit 54 of the ring adapter 50 may be inserted into the ear canal 30 with the MEMS microphone 86 supported by the tubular conduit 54 and communicating with a connector 98 extending, from the ear to a noise dosimeter 12, e.g., an external dosimeter 12 or one built into the ear piece. An ear bud 60 may fit along the side of conduit 54 in the ear canal 30 such that the MEMS microphone samples the sound signals coming from the ear bud 60. In this embodiment, it is understood that the tubular conduit 54 may not need to be a tube transmitting sound pressure to an external dosimeter since the MEMS microphone detects the sound directly from the inner ear. In one embodiment, the ear bud 60 may be an in-ear hearing aid device.

As seen in FIG. 5, the small flexible silicone tube 70 of the ring angle adapter 64 may be inserted into the ear canal 30 with the MEMS microphone 86 supported by the silicone tube 70 and communicating with a connector extending from the ear to a noise dosimeter 12, e.g., an external dosimeter 12 or one built into the ear piece. An earpiece 74 may fit over the ear canal 30 or share the volume of the ear canal 30 with the silicone tube 70. In this embodiment, it is understood that the silicone tube 70 may not need to be a tube transmitting sound pressure to an external dosimeter since the MEMS microphone detects the sound directly from the ear canal. In one embodiment, the earpiece 74 may be an in-ear hearing aid device.

Figure 10:
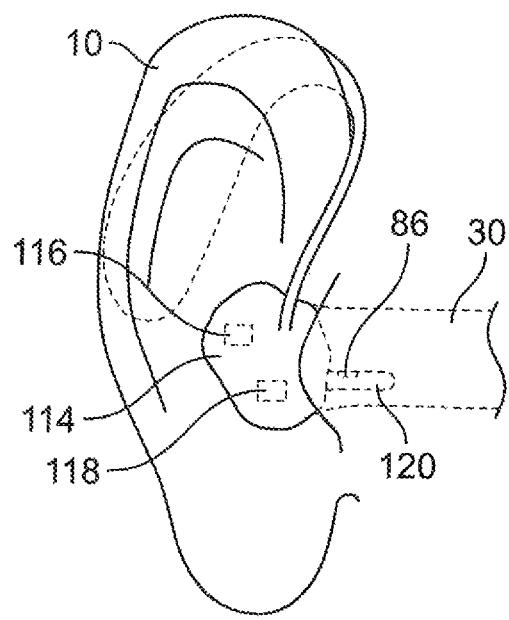
FIG. 10 is a figure similar to that of FIG. 6 showing a hearing aid having a built-in, microphone.

Referring to FIG. 10, the MEMS microphone 86 may be built into a hearing aid device 114. The hearing aid device 114 may have an external microphone 116 receiving external sound waves and an amplifier/speaker 118 for amplifying the external sounds waves and delivering them through an in-ear tube 120 to the ear canal 30. The in-ear tube 120 may support the MEMS microphone 86 within the ear canal 30 for recording the sound signals directly from the ear canal 30 and communicating the sound signals to a noise dosimeter 12, e.g., an external dosimeter or one built into the hearing aid device 114.

In-Line Sound Recorder

Figure 9:
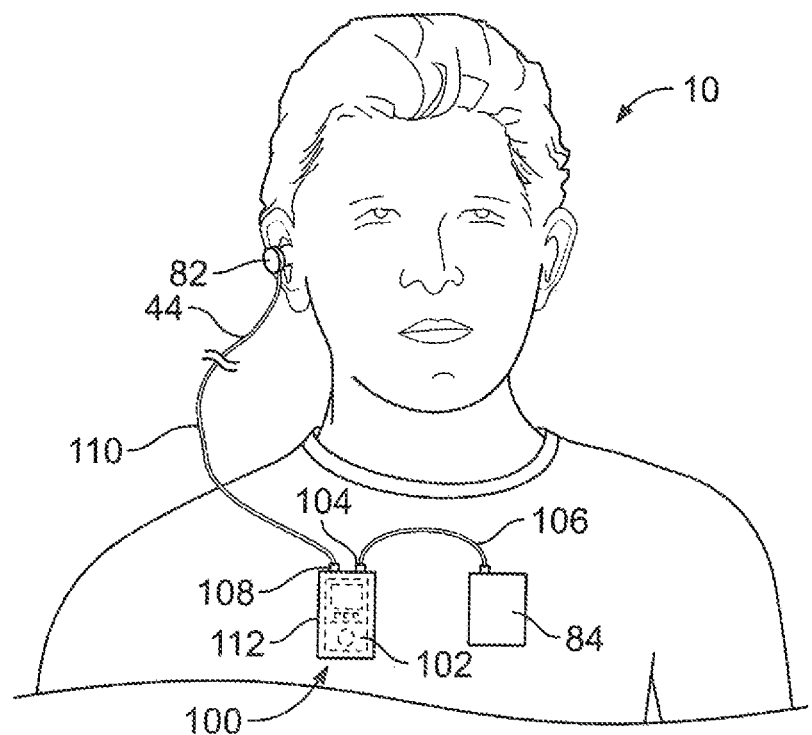
FIG. 9 is a simplified depiction of an in-line recording device installed between remote audio transducer and the in-ear mold.

Referring to FIG. 9, it may be desired to isolate the ambient noise received within the ear canal 30 and the noise received from the remote audio transducer 84. An in-line device 100 may be installed between the remote audio transducer 84 and the earpiece 82 or headset in, order to record the audio output from the remote audio transducer 84 and store the audio signals for later evaluation.

The in-line device 100 may include an audio recorder 102 for recording the audio output communicated from the remote audio transducer 84. Audio recorders 102 of this type are commercially available from the Sony Corporation of Tokyo Japan, for example, model Sony 1CD PX333.

The audio recorder 102 may receive the audio output through an auxiliary input connector 104 from the remote audio transducer 84. The connection may be made through a flexible conductor 106, for example, a 3.5 mm audio cord, connecting the remote audio transducer 84 to the audio recorder 102. The audio recorder 102 records the incoming sound signal and saves the signal as, for example, a MP3 file or WAV file. The audio recorder 102 may collect the sound signal with a minimum sampling frequency of 44.1 kHz and may store data for at least eight hours or a normal workday. The sound signal is logged and saved by the audio recorder 102.

Simultaneous to the recording, the sound signal is outputted from the audio recorder 102 through an auxiliary output connector 108 to the earpiece 82 where it is communicated, to the individual 10 as it would if the audio recorder 102 was not installed in-line. The connection may be made through a flexible conductor 110, for example, a 3.5 mm audio cord, connecting the audio recorder 102 to the earpiece 82. A tube 44 with an adaptor may be installed between the audio recorder 102 and earpiece 82 for transmission of the sound signal through the earpiece 82.

The audio output may be evaluated by occupational noise specialists who will compare the log data with known characteristics of the earpiece 82 to determine the noise exposure to the individual 10. The automatic audio file may be converted into arrays of data providing voltage data that can be used to analyze sound exposure levels. For example the MP3 file may be converted to a CSV file so that the data is compatible with data normally received by the dosimeter 12 and which logs exposure data for later evaluation.

The in-line device 100 may be protected by a waterproof or water resistant case 112 holding the in-line device 100 therein but allowing communication cables to extend from the ease 112 for connection. The case 112 may include a clip so that the individual 10 may conveniently where the in-line device 100 on their clothing.

Certain terminology is used herein for purposes of reference only, and thus is not intended to be limiting. For example, terms such as "upper". "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a microprocessor" and "a processor" or "the microprocessor" and "the processor," can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications are hereby incorporated herein by reference in their entireties.

What we claim is:

1. A system for making in-ear measurements of sound pressure levels of a human user, comprising:

an ear piece sized to fit within an ear canal of the human user and defined by a tubular stub having a channel extending along a channel axis from the outer ear to the ear canal and sized to releasably receive a sound transmitting tube adapted to conduct sound pressure signals along the channel into the ear canal from an external audio device and having a port having a port axis transverse to the channel axis of the channel: and a microphone within the ear canal positioned within the port and displaced from a path of the channel and adapted to receive sound pressure signals from within the ear canal wherein the sound pressure signals are communicated to a sound monitor; wherein the port is on an exterior surface of the tubular stub.

2. The system of claim 1 wherein the microphone is substantially flush with the exterior surface of the tubular stub.

3. The system of claim 1 wherein the microphone is mounted on a printed circuit board.

4. The system of claim 3 wherein the microphone is a MEMS microphone.

5. The system of claim 1 wherein the ear piece has a rim sized to fit within a concha of an outer ear of the human user.

6. The system of claim 1 wherein the tubular stub receives the audio signal from a remote transducer.

7. The system of claim 6 wherein the remote transducer is a two-way radio.

8. The system of claim 6 further comprising an audio recording device installed between the remote transducer and the sound transmitting tube and recording the audio signal.

9. The system of claim 8 wherein the audio recording device is recording and simultaneously outputting the audio signal to the sound transmitting tube.

10. The system of claim 9 wherein the audio recording device converts the audio signal to a MP3 file.

11. The system of claim 1 further comprising a hearing aid sharing a volume of the ear canal with the ear piece.

12. The system of claim 1 wherein the ear piece is a hearing aid further comprising an external microphone and an amplifier.

* * * * *